(12) United States Patent
Menéndez Martín et al.

(10) Patent No.: US 11,104,084 B2
(45) Date of Patent: Aug. 31, 2021

(54) METHOD AND SYSTEM FOR REWORKING A COMPOSITE LAMINATE

(71) Applicant: Airbus Operations, S.L., Getafe (ES)

(72) Inventors: José Manuel Menéndez Martín, Getafe (ES); Raúl Alberto Cabañas Contreras, Getafe (ES); Pedro Cabrera Rodríguez, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 49 days.

(21) Appl. No.: 16/655,414

(22) Filed: Oct. 17, 2019

(65) Prior Publication Data

US 2020/0122412 A1 Apr. 23, 2020

(30) Foreign Application Priority Data

Oct. 19, 2018 (EP) ..................................... 18382747

(51) Int. Cl.
*B29C 70/38* (2006.01)
*B29C 70/54* (2006.01)
*B29C 73/12* (2006.01)

(52) U.S. Cl.
CPC .......... *B29C 70/386* (2013.01); *B29C 70/545* (2013.01); *B29C 73/12* (2013.01)

(58) Field of Classification Search
CPC ..... B29C 70/38; B29C 70/382; B29C 70/384; B29C 70/386; B29C 70/388; B29C 73/12; B32B 43/00; B32B 43/003; B32B 43/006
See application file for complete search history.

(56) References Cited

U.S. PATENT DOCUMENTS

| 2007/0095451 A1* | 5/2007 | Kramp | B29C 70/30 156/64 |
| 2012/0247643 A1* | 10/2012 | Kramp | B29C 70/30 156/64 |
| 2019/0056334 A1* | 2/2019 | Safai | B32B 37/14 |

FOREIGN PATENT DOCUMENTS

| WO | 2012022972 A2 | 2/2012 |
| WO | 2016179616 A1 | 11/2016 |

OTHER PUBLICATIONS

Translation of WO2016/179616, Nov. 17, 2016, Heieck et al (Year: 2016).*
European Search Report; priority document.

* cited by examiner

*Primary Examiner* — George R Koch
(74) *Attorney, Agent, or Firm* — Greer, Burns & Crain, Ltd.

(57) ABSTRACT

A method for reworking a composite laminate comprising a plurality of tapes, comprising the following steps: detecting the occurrence of a defect on a tape of composite material while the tape is being laid up; continuing the lay-up of the defective tape until a tape length is formed which surpasses a manufacturing length of the tape; catching the part of the defective tape that surpasses the manufacturing length of the tap; cutting the defective tape in the part of the defective tape that surpasses the manufacturing length of the tape; removing from the laminate the caught defective tape by the catching system, and laying-up a replacement tape in the place of the removed defective tape.

12 Claims, 14 Drawing Sheets

METHOD AND SYSTEM FOR REWORKING A COMPOSITE LAMINATE

CROSS-REFERENCES TO RELATED APPLICATIONS

This application claims the benefit of the European patent application No. 18382747.6 filed on Oct. 19, 2018, the entire disclosures of which are incorporated herein by way of reference.

FIELD OF THE INVENTION

The invention relates to the automated manufacturing of fiber reinforced composite laminates by using automated tape or tow placement machines. The invention is applicable to all the parts of the structure of an aircraft or any composite part used in the aerospace field.

BACKGROUND OF THE INVENTION

Laminates comprising a plurality of plies of composite are known, these laminates are being laid up by an automated tape placement machine comprising a laying head which lays one tape or a plurality of tapes per trajectory of the laying head. The plurality of tapes laid in a trajectory are usually called a course.

Nowadays, the manufacturing process of fiber reinforced plastic parts, typically called composite parts, is highly automated by using tape placement machines, both in the case of using resin preimpregnated tapes or dry tapes. FIG. 1 shows a schematic of a typical tape placement machine end effector with two laying heads.

In a tape placement machine, the movement of the machine itself allows the deposition of the tape. The action of a pressure roller and the eventual use of a heat source, whose presence and characteristics depend on the characteristics of the tape, allows the adherence of the tape to the laying tool or the laminate deposited in previous operations.

To end the laying, the tape is clamped and cut using a blade or alternative system, for instance, in FIG. 2 the clamping is done using the adding rollers.

Despite the high level of automation of the tape deposition, when a defect is detected during or after laying, the rework has to be done manually by an operator using a blade knife or other instrument to remove the defective tape. The replacement of the removed tapes can be then done manually or using again the automated placement machine.

SUMMARY OF THE INVENTION

An object of the invention is the improvement of the automated process of manufacturing composite laminates. The advantages with respect to the prior art are the systematization of the rework process, improving the quality of the laminate after the rework, the eventual lead time and labor savings and the enabling of full automation of the composite laying operations.

One of the objects of the invention is a method that comprises the following steps:
  detecting the occurrence of a defect on a tape of composite material while the tape is being laid up,
  continuing the lay-up of the defective tape until a tape length which surpasses a manufacturing length of the tape, i.e., a design length or a predetermined length at which the tape will be manufactured,
  catching the part of the defective tape that surpasses the manufacturing length of the tape by a catching system,
  cutting the defective tape by the automated tape placement machine in the part of the defective tape which surpasses the manufacturing length of the tape,
  removal from the laminate of the caught defective tape by the catching system, and
  laying-up a replacement tape by the automated tape placement machine after removal of the defective tape.

According to the above, the detection of the defect is performed simultaneously with the laying up process of the tape. In one embodiment of the invention the use of an online automated inspection system to detect the occurrence of a defect during the laying process is used, although the detection can have different levels of automation, from direct visual detection by an operator up to real time full automated defect detection/identification implying the coordination with a defect detection system.

Once the defect is detected, the lay-up process of the defective tape is continued until the end of the course, specifically extending an additional length over the predetermined or design length of the tape.

In that moment, the head of the machine could perform a movement to separate the laying head from the laminate, in one embodiment allowing the deployment of the rework system.

The next operation will be catching and removal of the defective tape or tapes by the catching system itself. When the tapes are removed, the rework system may retract to avoid interference with the laying heads and the replacement tapes will be laid by the machine as previously stated. The catching step and the cutting step may be performed in any order as long as the defective tape is cut and caught by the catching system.

It is also an object of the present invention to provide a reworking system and an automated tape placement machine comprising the reworking system comprising means configured for catching the defective tape when the occurrence of a defect on the tape or plurality of tapes is detected during the laying of the tape and comprising means for removing the caught defective tape from the laminate.

The automated tape placement machine object of the invention therefore comprises a reworking system according to the above and further comprises:
  means for receiving a signal that a defect has occurred on a tape that is being laid-up,
  means for continuing the lay-up of a defective tape until a tape length which surpasses the manufacturing length of the tape,
  means for sending a signal to the reworking system for catching the part of the defective tape which surpasses the manufacturing length of the tape and for removing the defective tape,
  means for cutting the defective tape before being removed, and
  means for laying-up a replacement tape after removal of the defective tape.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
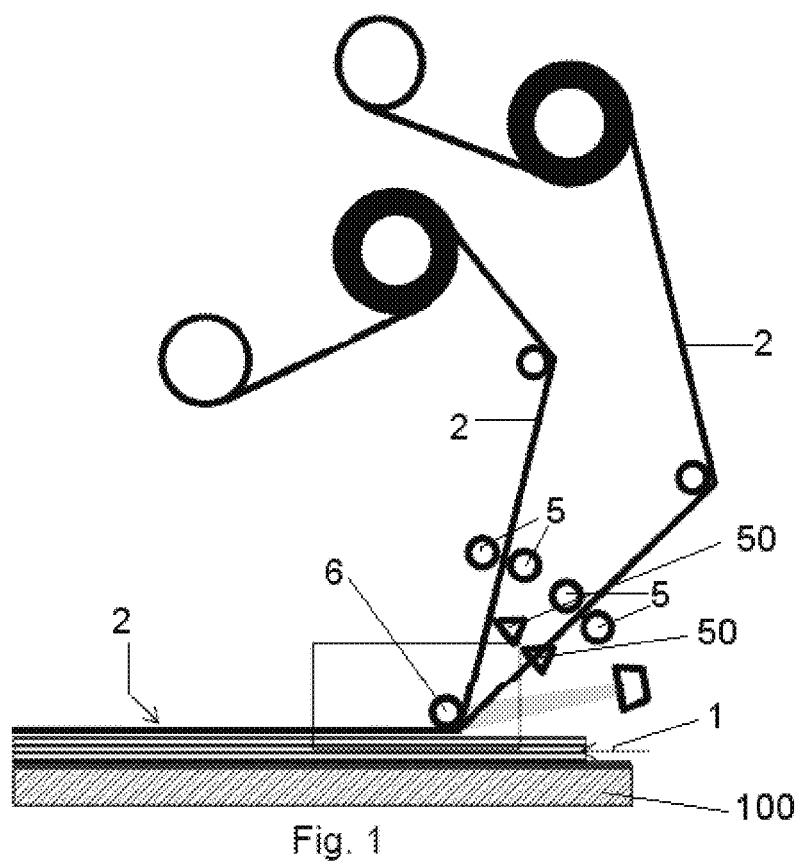
FIG. 1 shows a schematic representation of an automated tape placement machine.
Figure 2:
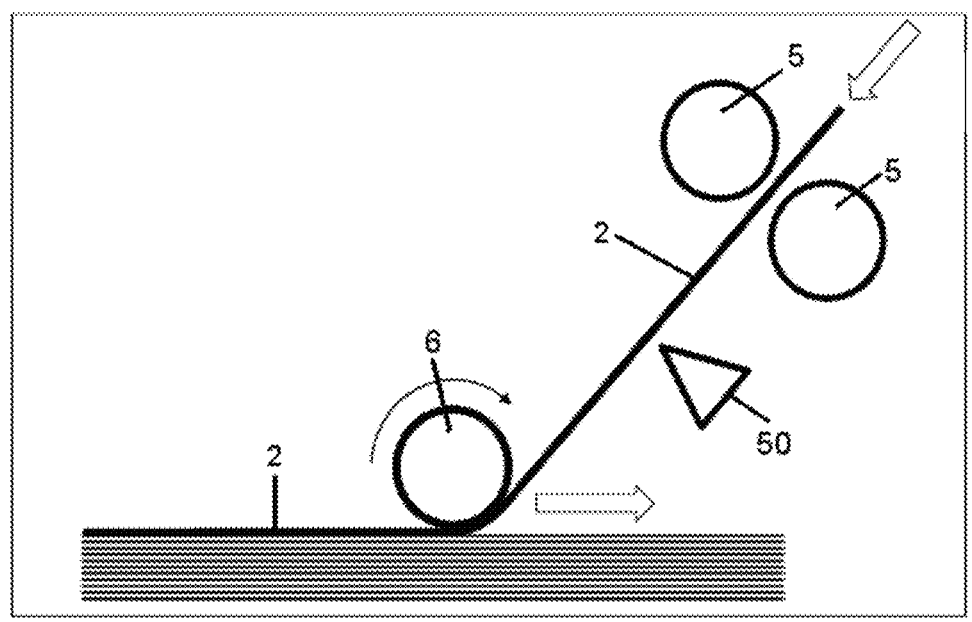
FIG. 2 shows a schematic representation of the cutting process in an automated tape placement machine.

FIG. 1 discloses a known automated taped placement machine manufacturing a laminate (1) over a mold (100) by laminating tapes (2) by means of two heads comprising at least a pressure roller (6), addition rollers (5) and cutters (50). In FIG. 2 the tape (2) is clamped using the adding rollers (5) and cut using a blade or alternative system to end the laying.

Figure 3:
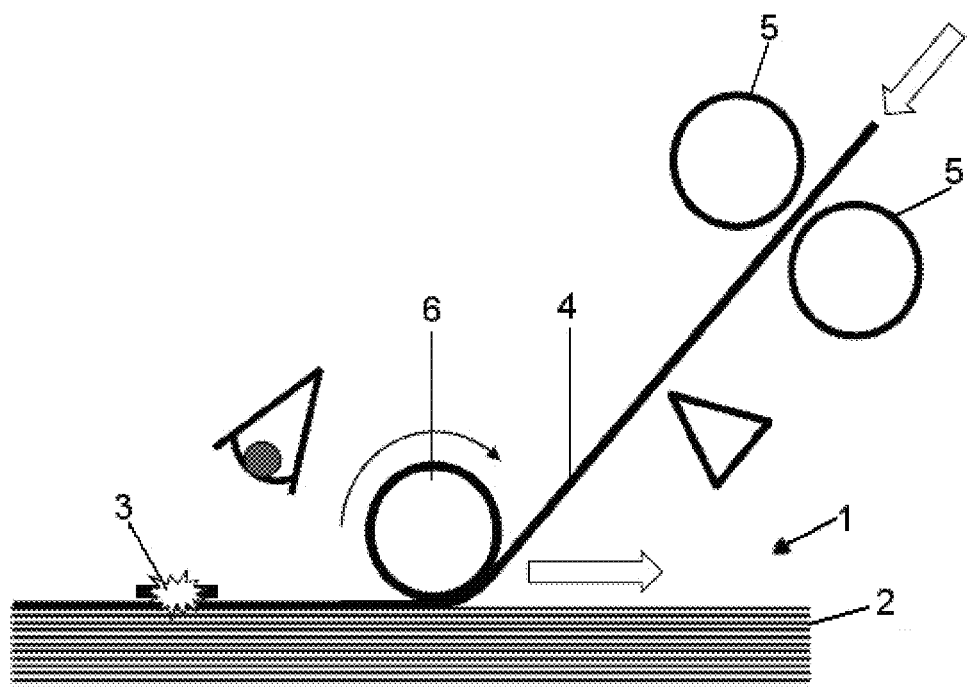
FIG. 3 shows a schematic representation of a first step of the invention in which a defect on a tape that is being laid is detected.
Figure 4:
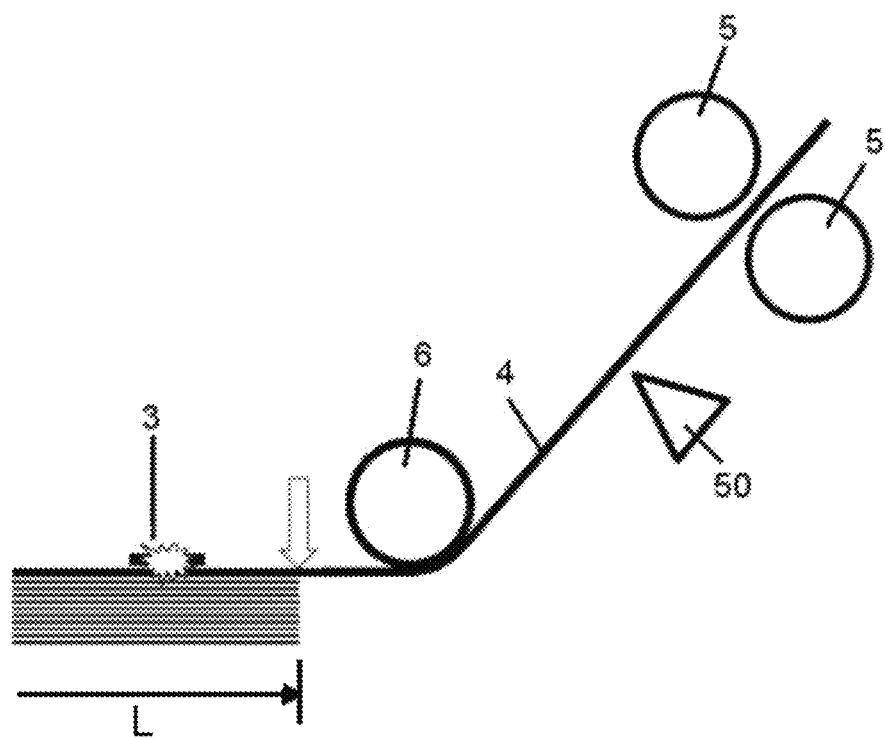
FIG. 4 shows a schematic representation of an additional step of the invention in which the laying-up process of the defective tape is continued until the end of a course.

FIG. 3 shows the detection of a defect (3) on a tape (4) while the tape (4) is being laid up. Afterwards, the lay-up of the defective tape (4) is continued until a tape (4) length that surpasses the manufacturing length (L) of the tape (4) is achieved as represented in FIG. 4. By rotation of the adding rollers (5) the defective tape (4) is placed between the pressure roller (6) and the laying surface to continue the laying operation.

In a multi-head machine, when laying multiple tapes (2), all the tapes (2) except the defective ones (4) are laid and cut according to the length of the original design of the part, except the defective ones (4) and those that may be selected to be also removed, that are extended an additional length. Therefore, the automated tape placement machine, once a signal of a defected tape (4) is received, continues the lay-up of a defective tape (4) until a tape (4) length is obtained that surpasses the manufacturing length (L) of the tape (4).

Figure 5:
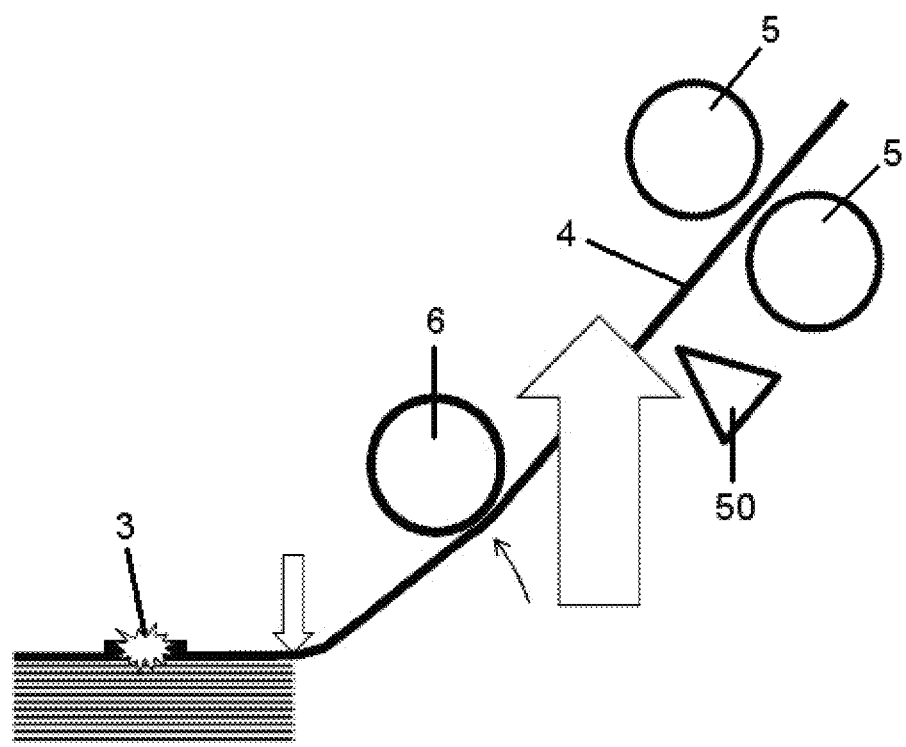
FIG. 5 shows a schematic representation of a next step of the invention in which the pressure roller is separated from the laminate.

In an embodiment, the catching system is deployed after detecting the occurrence of a defect (3) and retracted after removal of the defective tape (4). For allowing the mentioned deployment of the catching system, the laying head may be separated from the defective tape (4), more specifically, as shown in FIG. 5, the pressure roller (6) is lifted from the laminate (1).

Figure 6:
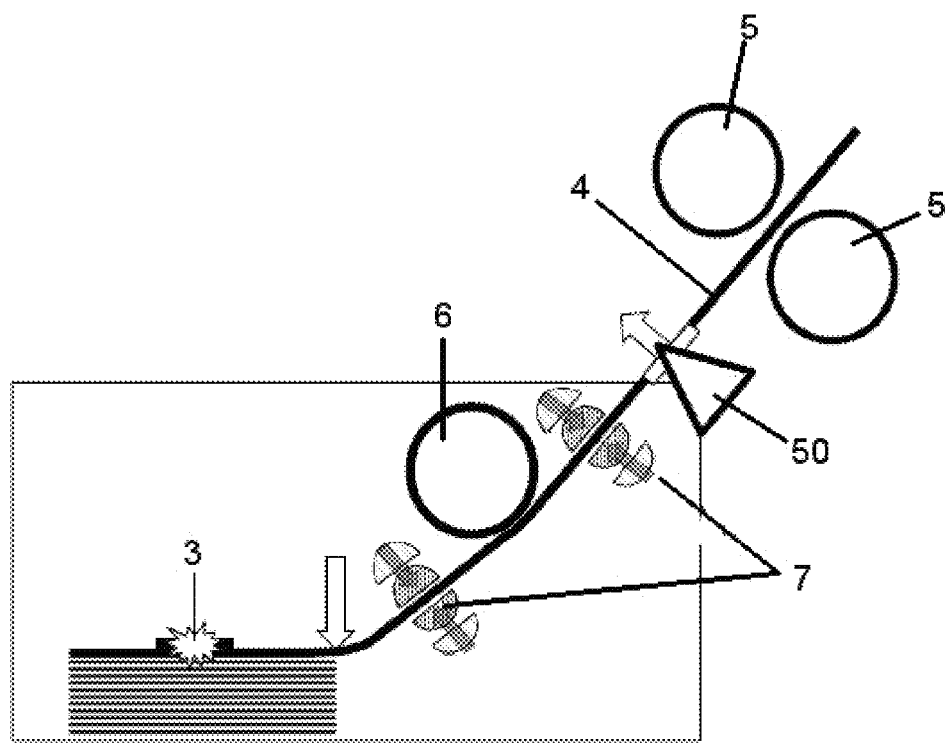
FIG. 6 shows a schematic representation of a next step of the invention in which two different embodiments of the rework system catch the defective tape.

The catching system of the embodiment shown in FIG. 6 comprises a clamp (7) with two jaws which traps the defective tape (4) to allow its removal. FIG. 6 discloses two different embodiments, the clamp (7) being located below the pressure roller (6) or the clamp (7) being located over the pressure roller (6).

The deployment of the jaws of the clamp (7) can be done by a longitudinal sliding movement, a rotational one, a telescopic extension or any other movement or combination of movements. These movements can be electric, pneumatic or any alternative considered appropriate.

Figure 7:
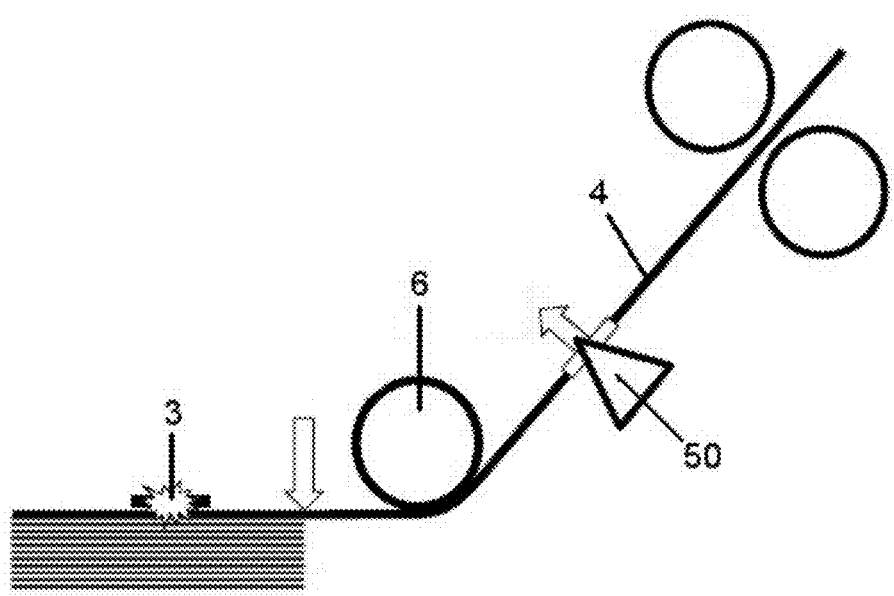
FIGS. 7 and 8 show a schematic representation of another embodiment in which the defective tape is firstly cut and afterwards the pressure roller is lifted from the laminate.
Figure 8:
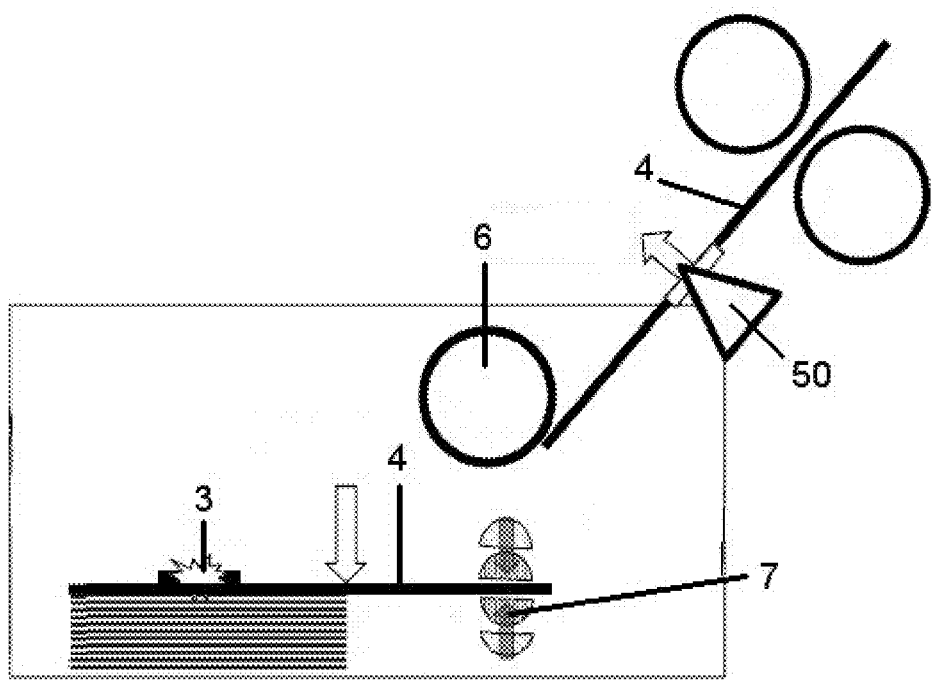

As previously commented, the catching step and the cutting step may be performed in any order:
  once the defective tape (4) or tapes (4) are clamped, the cutter (50) cuts them according to FIG. 6, or
  alternatively, the defective tapes (4) to be removed are firstly cut and afterwards are clamped according to FIGS. 7 and 8.

Figure 9:
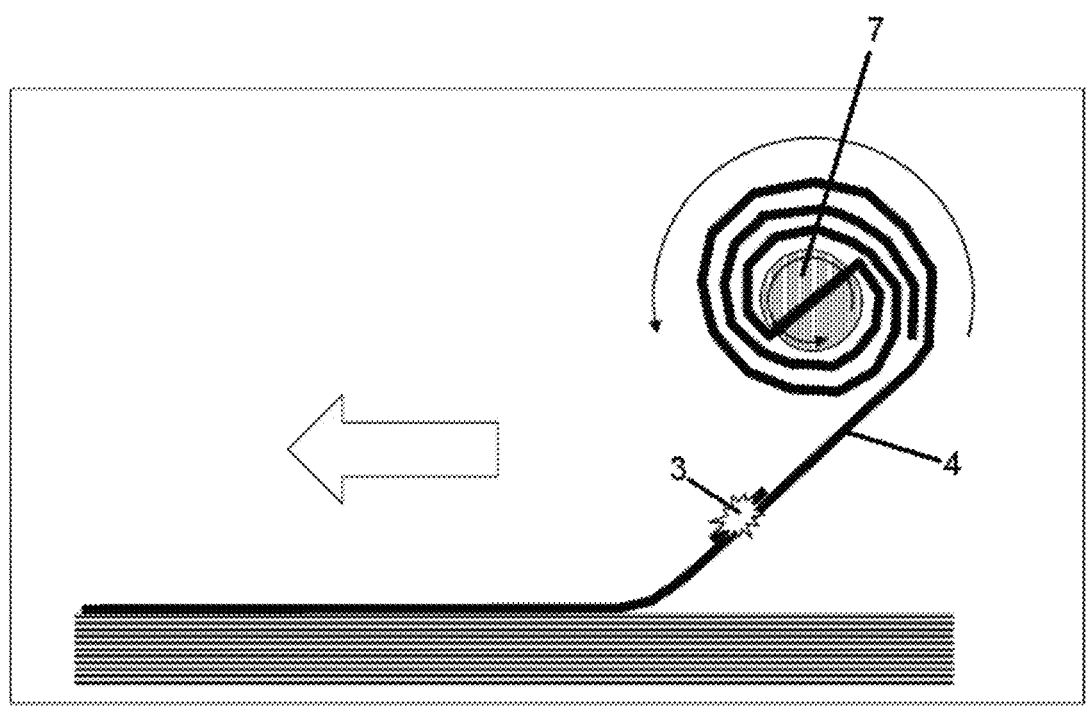
FIG. 9 shows a schematic representation of a next step of the invention in which the rework system rewinds the tape for its removal.
Figure 10:
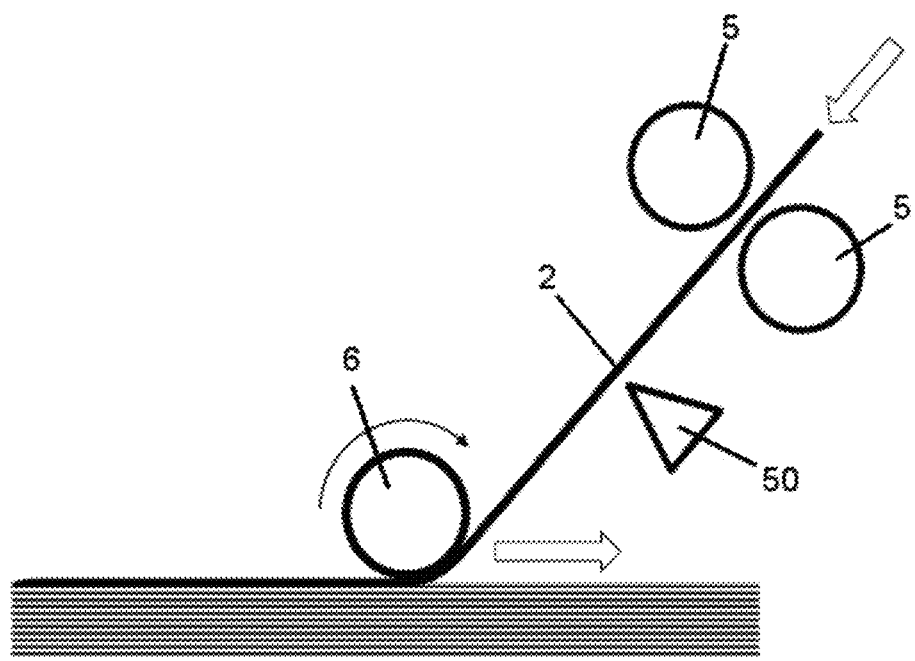
FIG. 10 shows a schematic representation of a next step of the invention in which the defective tape is replaced by a new one.

The removal of the defective tape (4) will be done by rewinding the defective tape (4) around the clamp (7) as shown in FIG. 9, preferably at a speed coordinated with the backwards movement of the lying head. Finally, a replacement tape (2) is laid-up by the automated tape placement machine after removal of the defective tape (4) as shown in FIG. 10.

As represented in the embodiment shown in FIGS. 11 to 14, in order to have the catching system always ready for the next rework operation, it is advisable to allow an automated release of the removed defective tape (4).

In one embodiment, the clamp (7) comprises two external shells (9) and two internal cores (8) located in the shells (9) located in an opposite configuration and that behave as a clamp to grab the defective tape (4). The internal cores (8) are movable with respect to the external shells (9) such that they trap the defective tape (4) in-between when they approach each other and release the defective tape (4) when they move away from each other. The clamp (7) comprises means for rewinding the defective tape (4) around the clamp (7), specifically, the defective tape (4) will be rewound around the external shells (9) when the clamp (7) turns.

Figure 11:
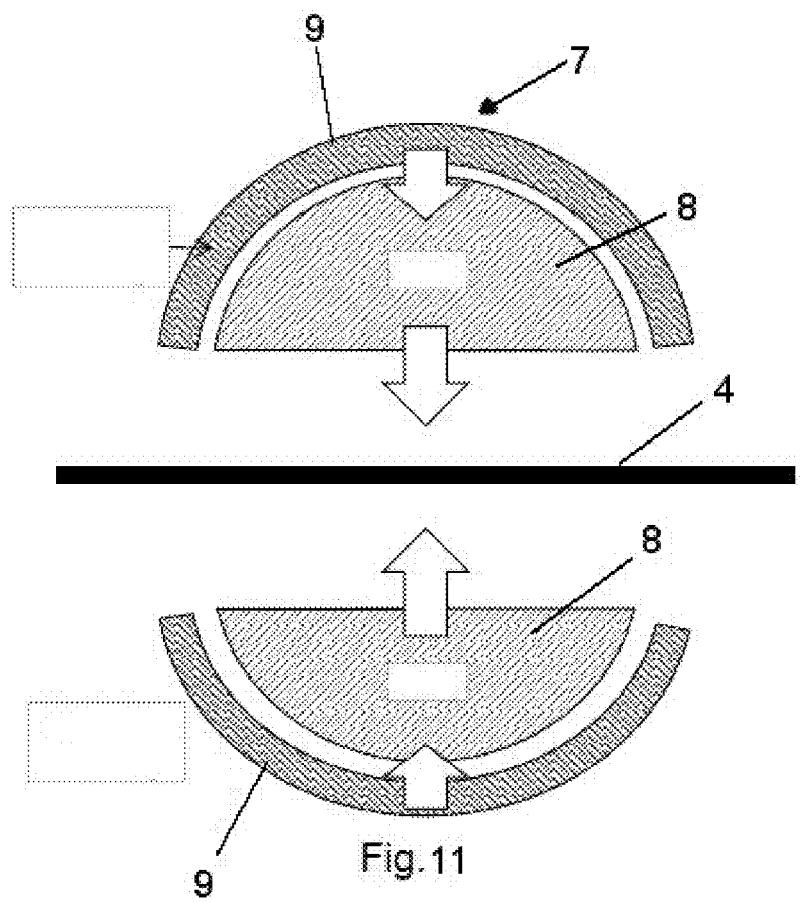
FIG. 11 shows a schematic representation of an embodiment of the catching element of the rework system.
Figure 12:
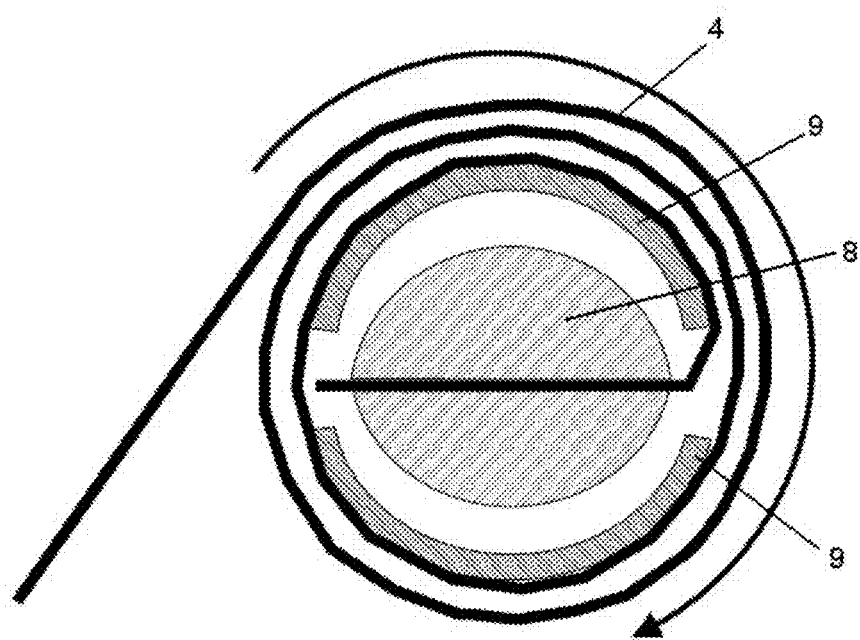
FIG. 12 shows a schematic representation of the rewind step of the catching element of the embodiment of FIG. 11.
Figure 13:
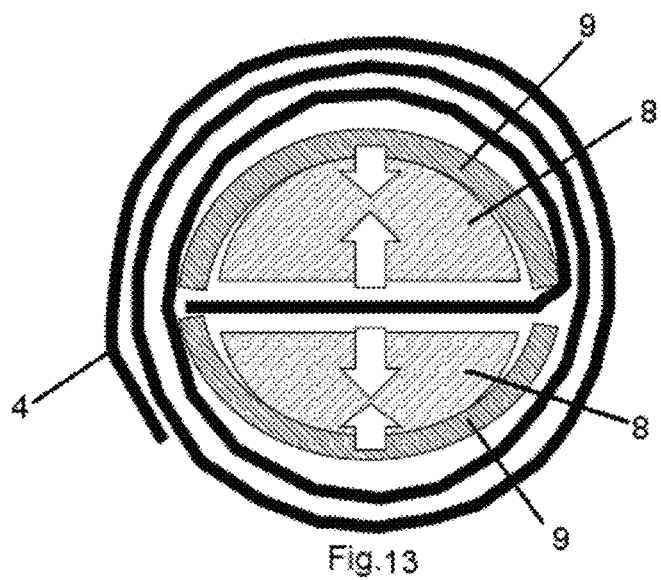
FIG. 13 shows a schematic representation of the release step of the catching element of the embodiment of FIG. 11.

FIG. 11 shows a first step in which the clamp (7) has both internal cores (8) separated so that the defective tape (4) is located in-between. FIG. 12 shows the internal cores (8) located against each other so that the defective tape (4) is caught by them and the turning of the clamp (7) makes the defective tape (4) rewind over the external shells (9). FIG. 13 shows the retraction of the inner cores (8) into the external shells (9) therefore liberating the defective tape (4).

Figure 14:
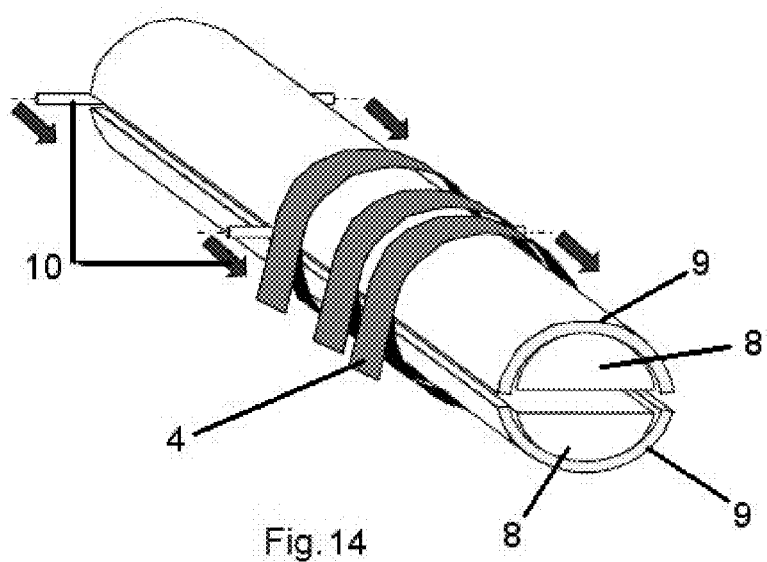
FIG. 14 shows a schematic representation of the removal step of the catching element of the embodiment of FIG. 11.

Finally, FIG. 14 shows one of the possible embodiments for releasing the defective tape (4) from the clamp (7) using a sliding arm (10) moving between the internal cores (8) in a direction parallel to the turning axis of the clamp (7) so that the sliding arm (10) pushes out the rolled defective tape (4).

The release and remove steps would be preferably done in a scrap area located in the laying zone or integrated in the head or the structure of the machine, this last option reduces the number of movements of the machine but increase the size, weight and complexity of the machine so the solution will be adapted to each case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for reworking a composite laminate, the laminate comprising a plurality of tapes of composite that are being laid up by an automated tape placement machine comprising a laying head, comprising the following steps:
    detecting an occurrence of a defect on a tape of composite material while the tape is being laid up,
    continuing the lay-up of the defective tape until a tape length is formed which surpasses a manufacturing length of the tape,
    catching the part of the defective tape that surpasses the manufacturing length of the tape with a catching system,
    cutting the defective tape in the part of the defective tape that surpasses the manufacturing length of the tape,
    removing from the laminate the defective tape caught by the catching system, and
    after removal of the defective tape, laying-up a replacement tape in place of the removed defective tape by the automated tape placement machine.

2. The method for reworking a composite laminate, according to claim 1, wherein an automated inspection system is provided for detecting the occurrence of the defect.

3. The method for reworking a composite laminate, according to claim 1, wherein the catching system is deployed over the laminate after detecting the occurrence of the defect and retracted from the laminate after removal of the defective tape.

4. The method for reworking a composite laminate, according to claim 3, wherein before deployment of the catching system, the laying head is separated from the defective tape.

5. The method for reworking a composite laminate, according to claim 1, wherein the catching system comprises a clamp with two jaws which trap the defective tape in-between.

6. The method for reworking a composite laminate, according to claim 5, wherein the removal of the defective tape is done by rewinding the defective tape around the clamp.

7. The method for reworking a composite laminate, according to claim 1, wherein the defective tape is cut after being caught by the catching system.

8. A reworking system for a composite laminate comprising a plurality of tapes of composite configured for being laminated by an automated tape placement machine comprising a laying head, wherein the reworking system comprises:
    a catching system configured to catch a defective tape when an occurrence of a defect on the tape is detected during the laying of the tape, and
        the catching system comprising means for removing a caught defective tape from the laminate,
    further comprising a clamp with two jaws configured to trap the defective tape in-between,
    wherein the clamp comprises two external shells and two internal cores located in the external shells and in an opposite location, the internal cores being movable with respect to the external shells such that they trap the defective tape in-between when they approach each other and release the defective tape when they move away from each other.

9. The reworking system for a composite laminate, according to claim 8, wherein the clamp comprises means for rewinding the defective tape around the clamp.

10. The reworking system for a composite laminate, according to claim 8, wherein the defective tape is rewound around the external shells.

11. A reworking system for a composite laminate comprising a plurality of tapes of composite configured for being laminated by an automated tape placement machine comprising a laying head, wherein the reworking system comprises:
    a catching system configured to catch a defective tape when an occurrence of a defect on the tape is detected during the laying of the tape, and
        the catching system comprising means for removing a caught defective tape from the laminate, and further comprising:
    means for receiving a signal that a defect has occurred on a tape that is being laid-up,
    means for continuing the lay-up of the defective tape until a tape length is formed that surpasses a manufacturing length of the tape,
    means for sending a signal to the reworking system for catching the part of the defective tape that surpasses the manufacturing length of the tape and for removing the defective tape,
    means for cutting the defective tape in the part of the defective tape that surpasses the manufacturing length of the tape before being removed, and
    means for laying-up a replacement tape after removal of the defective tape.

12. The reworking system for a composite laminate, according to claim 11, further comprising a clamp with two jaws configured to trap the defective tape in-between.

* * * * *